(12) United States Patent  (10) Patent No.: US 7,050,925 B2
Simakov et al.  (45) Date of Patent: May 23, 2006

(54) APPARATUS FOR INTEGRATED TOOL MANUFACTURE AND METHOD THEREFOR

(75) Inventors: Michael Simakov, Brighton Vic. (AU); Christopher Morcom, Celle (DE); Carsten Sachs, Hannover (DE); Christian Dilger, Leinfelden-Echterdingen (DE)

(73) Assignee: Walter AG, Tubingen (DE)

( * ) Notice: Subject to any disclaimer, the term of this patent is extended or adjusted under 35 U.S.C. 154(b) by 0 days.

(21) Appl. No.: 10/739,147

(22) Filed: Dec. 19, 2003

(65) Prior Publication Data

US 2005/0038624 A1 Feb. 17, 2005

(30) Foreign Application Priority Data

Dec. 20, 2002 (DE) ................................. 102 61 227

(51) Int. Cl.
G06F 15/00 (2006.01)
(52) U.S. Cl. ...................................... 702/127; 702/189
(58) Field of Classification Search ............. 324/158.1; 451/1, 5; 483/1, 16, 17, 28, 30; 700/1, 9, 700/28, 51, 86, 90, 95, 96, 108, 109, 245; 702/33, 81, 84, 127, 155, 167, 182, 188, 702/189; 715/961, 965, 966, 967, 968; 718/100
See application file for complete search history.

(56) References Cited

U.S. PATENT DOCUMENTS

| 5,315,503 | A | * | 5/1994 | Kato et al. ..................... 700/87 |
| 5,731,982 | A | * | 3/1998 | Namba et al. ............... 700/182 |
| 5,815,400 | A | * | 9/1998 | Hirai et al. .................. 700/173 |
| 5,984,503 | A | * | 11/1999 | Strickland et al. ............ 700/95 |
| 6,522,941 | B1 | * | 2/2003 | Tashiro et al. .............. 700/180 |
| 6,779,175 | B1 | * | 8/2004 | Susnjara ...................... 717/136 |
| 2003/0187624 | A1 | * | 10/2003 | Balic ............................ 703/1 |

* cited by examiner

Primary Examiner—John Barlow
Assistant Examiner—Douglas N Washburn
(74) Attorney, Agent, or Firm—Drinker Biddle & Reath LLP

(57) ABSTRACT

A mechanism for integrated tool manufacture includes a display module and an input module for interrogated all required machining operations and measuring operations and for defining all measurement points, and a machining program module, which from the inputs generates a machine control program, and a measurement program module, which from the inputs pertaining to the measurement generates a measurement program for controlling a measuring machine. Both program modules i.e., the machining program module and the measurement program module, access one and the same data set, which is defined for instance by geometric model. This common data set permits interactive setup of a workpiece on the screen, and the measurement program and the machining program are set up along with it, consistently and in parallel.

15 Claims, 11 Drawing Sheets

APPARATUS FOR INTEGRATED TOOL MANUFACTURE AND METHOD THEREFOR

This application claims priority under 35 U.S.C. §§119 and/or 365 to patent application Ser. No. 102 61 227.7 filed in Germany on Dec. 20, 2002, the entire content of which is hereby incorporated by reference.

BACKGROUND OF THE INVENTION

The invention relates to an apparatus for integrated tool manufacture and to a method for controlling a machine tool and an associated measuring device.

For producing and grinding tools, tool grinding machines are often used in which one or more tools, such as grinding wheels, can be purposefully moved and rotated in multiple directions in space in order to generate complicated geometries, for instance of drills, milling cutters, step drills or the like. This is done by causing the corresponding grinding wheels to machine a blank, for which purpose the blank and/or the grinding wheels are moved along predetermined paths. The paths are generated by the superposition of motions of various driving and guiding devices. These devices are in turn controlled by a machine control program, such as an NC program. Generating suitable NC programs requires knowledge on the part of the user about the machine geometry and NC programming as well as a good capacity for thinking in three dimensions. While the NC programmer seeks to write a program in such a way that the moving grinding wheels create the shape specified by the scale drawing on the blank, he must specify the motion of the individual components (blank and grinding wheels) in increments which have no direct relationship with the drawing data.

For the sake of quality control, measurements are often needed which might need to be performed automatically. This is done by measuring devices with tactile, optical or other kinds of measurement pickups. The measuring devices may be part of the grinding machine or may be in the form of a separate measuring machine.

The motion of the specimen and the sensors, interrogating them, and processing the measured value must in turn be controlled by a measurement program which must be set up by the user.

Changes in the grinding program (the NC program for controlling the grinding machine) in many cases also make it necessary to modify the measurement program. The user must assure both.

U.S. Pat. No. 6,290,571 discloses a program system with which the setup of the NC program can be accomplished without detailed knowledge of machine geometry or NC programming. To that end, the image of a blank and the image of a grinding wheel or other grinding tool on a screen are moved relative to one another in such a way that the desired workpiece appears in virtual form on the screen. The workpiece or tool paths taken are plotted and converted into NC programs.

Measuring the tools created in this way is a separate task, for which U.S. Pat. No. 6,290,571 offers no solution.

With this as the point of departure, it is the object of the invention to create an apparatus for integrated tool manufacture.

It is also an object of the invention to disclose a method for controlling a machine tool and an associated measuring device. Operating the apparatus and performing the method should be possible for a user without knowledge of programming languages.

SUMMARY OF A PREFERRED EMBODIMENT OF THE INVENTION

The apparatus for integrated tool manufacture has an input module, with a preferably graphical user interface. The input module includes a display device or is connected to such a device. On this display device, a plurality of input windows and at least one display window can be opened. The input windows create access to a supply of input objects. Typically, input objects pertain to a machining operation. They can therefore be considered as machining objects and for instance define one complete machining operation. For instance, a grinding operation in which the grinding tool covers one complete positioning distance is a machining operation in the above sense. For instance, when a grinding wheel moves along a helical path on a cylindrical blank, a helical flute is obtained. Such a flute is one example of an input object. For instance, cutting edges of a tool are created by superimposing software objects, that is, input objects. The superposition is done by data processing in the same way as if the clearance created by the machining operation is taken away from a blank or a partly machined workpiece. This creates cutting edges or other body edges by subtracting the three-dimensional sum of all the machining objects from the blank. Body edges are then created, in the form of lines of intersection of input objects with the blank and lines of intersection between software objects superimposed on one another.

Another example of input objects is flanks that are likewise generated by a relative motion between the grinding wheel and the workpiece. Finally, input objects thus always characterize a relative motion between a grinding wheel and a workpiece. These input objects are software objects and are selectable for instance via menus. At least one parameter or a set of parameters belongs to each input object, and with this parameter or set of parameters the length, depth, steepness, and other details of a flute or other details of some other input object are for instance defined. These input parameters are likewise assigned input windows or fields in the context of the input module, and these windows or fields make data acquisition possible. Thus the user can generate a workpiece on the screen on the basis of drawing data, without having to use a programming language. From the supply of input objects, he merely selects those input objects whose associated machining operations must be performed on the blank, and he parametrizes these objects. This is done by inserting values into masks on the screen.

While the user in this way now generates a data set for describing the workpiece, he can actuate the inputs required for setting up the measurement program. To that end, the input module keeps a supply of measurement objects, that is, objects to be measured, in readiness from which measurement objects can be selected and parametrized. The parametrizing is done by linking measurement objects with input objects. As the measurement objects, inspection points can for instance be defined whose distance from the axis of rotation (radius), distance from other inspection points, distance from body edges, and so forth are detectable. Other measurement objects can for instance be angles, which are defined by inputting a plurality of inspection points, linear faces, or the like. The linkage between inspection points or other measurement objects with input objects can be done for instance by binding an inspection point with a body edge, such as a cutting edge. Once this linkage is defined, any change in the parametrizing of an input object that would cause a shift in the cutting edge at the same time causes a shift in the applicable inspection point which is bound to this cutting edge as well.

The apparatus of the invention includes a display module for visually displaying an image of a tool resulting from the inputs, the tool serving here as a workpiece. The display module can cooperate with the same monitor as the input module. It can be fused with the input module to make a program module or can partly overlap the input module and share resources and/or routines. With the display module, the consistency and correctness of the inputs that have been made by selecting input objects and parametrizing them can be ascertained immediately and intuitively.

A machining program module is also provided, which from the input objects and their parameters generates a machine control program, which can be transmitted to the grinding machine. This is an NC program generator.

The apparatus according to the invention also includes a measurement program module, with which a measurement program is generated from the input objects and the measurement objects. Thus once the workpiece has been generated on the screen, not only is the NC machining program available, but parallel to it the NC measurement program as well. Both programs are consistent with one another, so that a sample workpiece produced can be automatically measured immediately.

The linkage between the input module, the machining program module and the measurement program module is preferably done by way of a geometric model, which contains all the work instructions (data about work steps to be performed) and a mathematical representation of the outcome of the work (for instance, descriptions of surface structures of the workpiece in mathematical form or in the form of tables). The result is a data structure in which changes in the work instructions, for instance because of a change in the parametrizing of input objects, immediately leads to an adaptation of the measurement program as well.

BRIEF DESCRIPTION OF THE DRAWING

Further details of advantageous aspects of embodiments of the invention will become apparent from the ensuing description and from the drawing. In the drawing, exemplary embodiments of the invention are illustrated.

DETAILED DESCRIPTION OF PREFERRED EMBODIMENTS OF THE INVENTION

Figure 1:
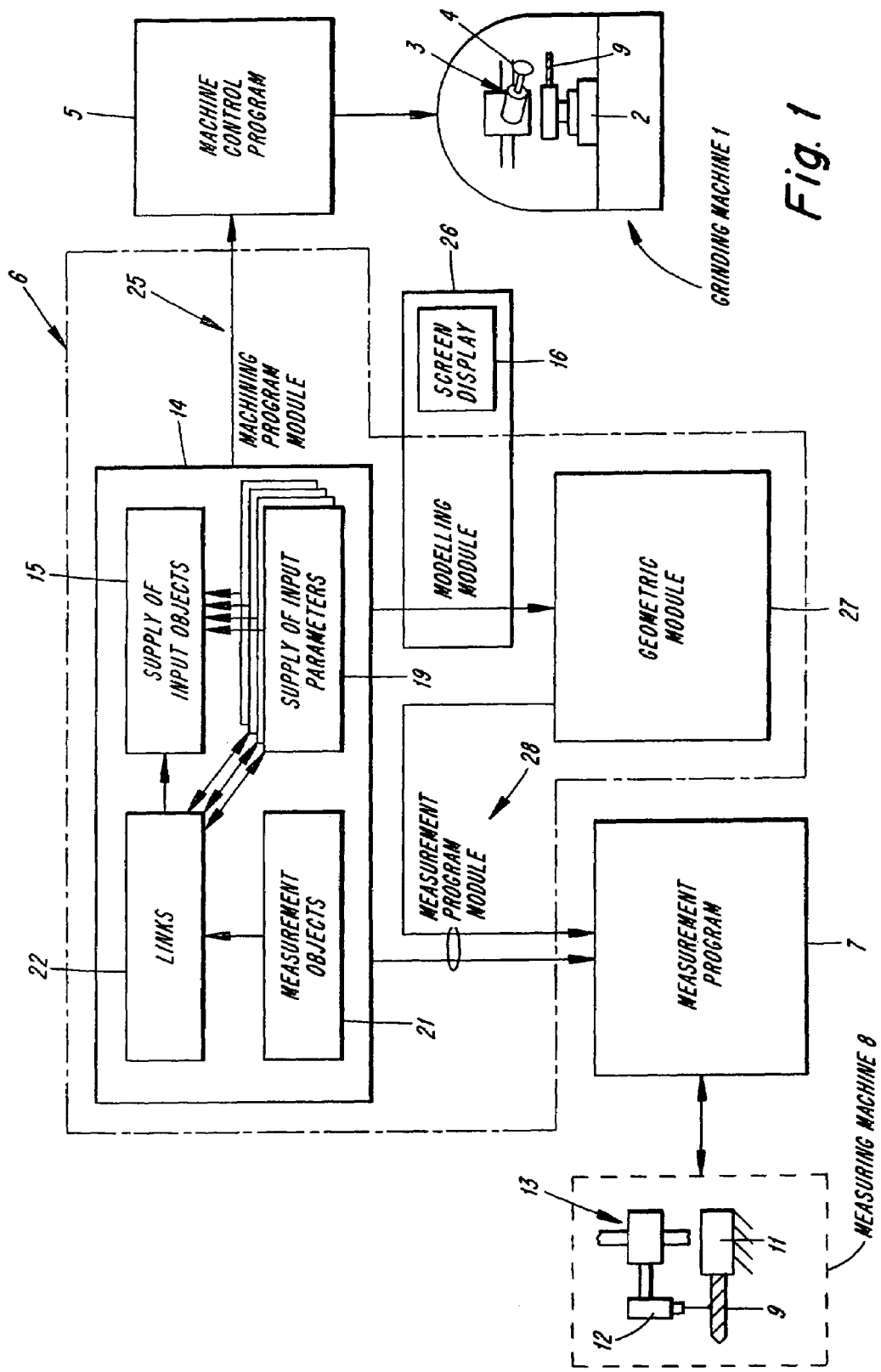
FIG. 1 shows the software structure of a machining and measuring apparatus in the form of a block diagram.

In FIG. 1, a grinding machine 1 is shown for producing tools, such as drills, milling cutters and the like, which will thus be called workpieces here. The grinding machine 1 includes a conventional workpiece holder 2, which can be supported in either fixed or movable fashion. It can be stationary or can be adjustable by means of an adjusting device in one or more directions in space. Associated with the workpiece 2 is a conventional grinding head 3 with one or more grinding wheels. The grinding head 3 is movable and pivotable in multiple directions in space. The grinding wheel 4 is also driven to rotate.

A machine control program 5 which has been created with a program generator 6 serves to control the motions of the grinding head 3 and/or the workpiece holder 2. This program also serves to set up a measurement program 7 for a measuring device, for instance in the form of a measuring machine 8, with which a workpiece 9 machined by the grinding machine 1 is measured. To that end, the measuring machine 8 has a conventional workpiece holder 11 and one or more conventional measuring heads 12, which are movable spatially via a conventional positioning device 13 in order to scan measurement points on the workpiece 9 and furnish measurement values accordingly.

The measuring device can be embodied either, as shown, as a separate measuring machine 8 or as a component of the grinding machine 1.

Figure 6A:
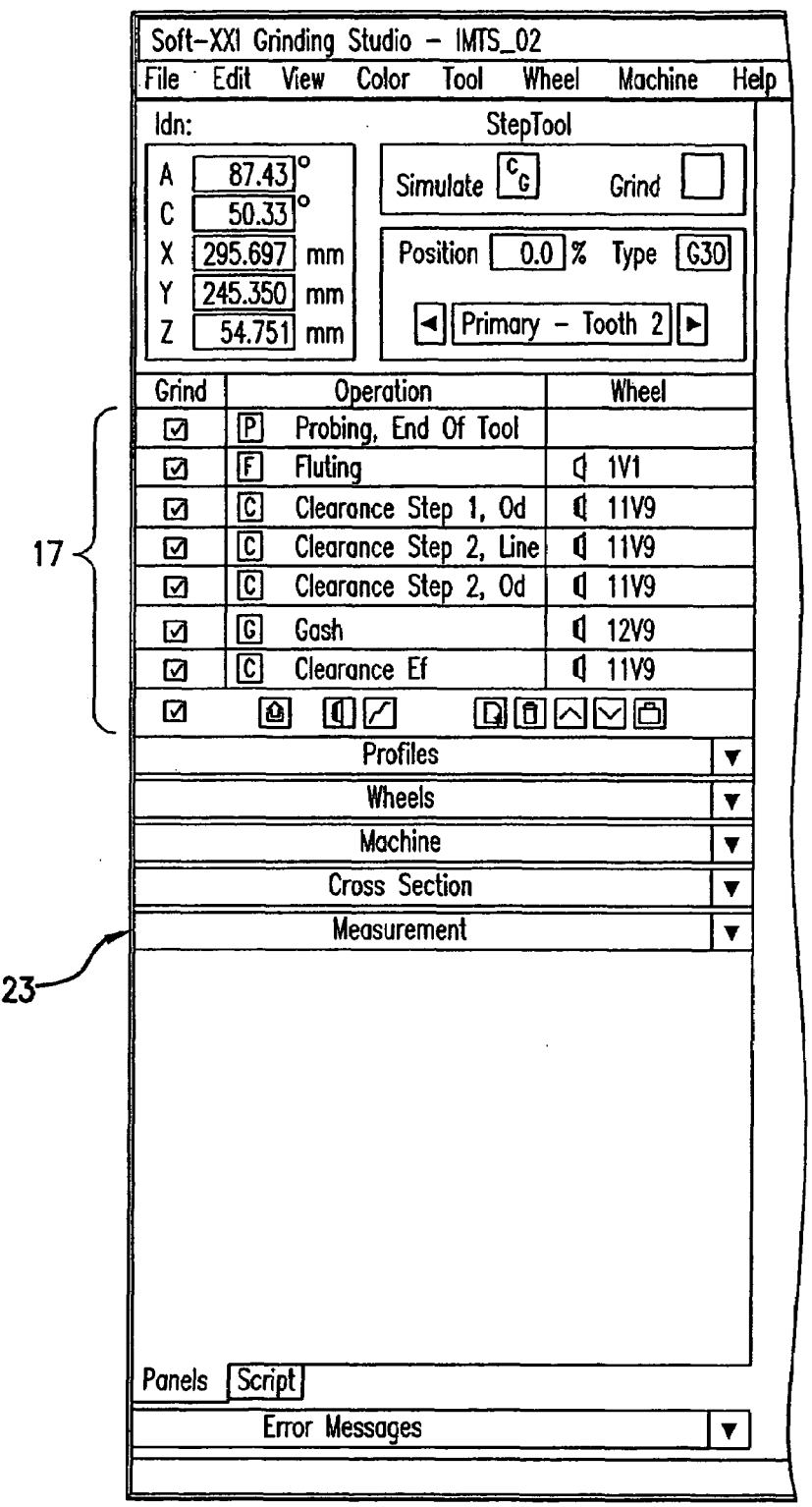
FIGS. 6–8 show the screen masks for inputting input objects, input parameters, and measurement objects.
Figure 6B:
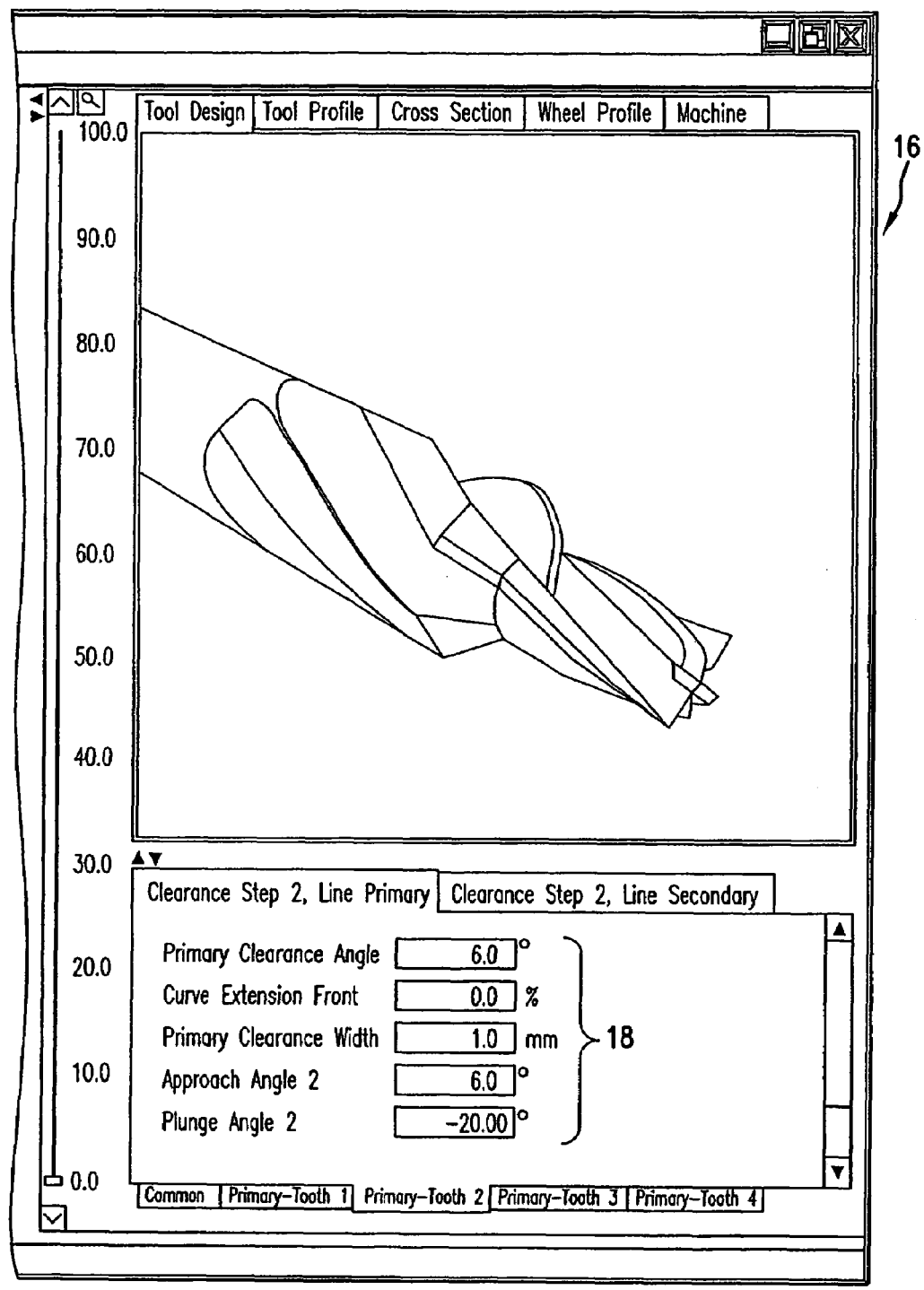

The program generator 6 includes an input module 14, which is used for acquisition of all the inputs required for setting up a machine control program and for setting up a measurement program. The inputting is done in object-oriented fashion using input objects 15, which can each be associated with individual machining operations. In this respect, see FIG. 6. This drawing shows a screen display 16, for instance on a PC or other computer provided in the grinding machine 2, on which computer the program generator 16 runs. The screen display 16, via a first input field 17, makes individual input objects of an object supply accessible. In FIG. 6, the input object "Clearance Step 2, Line" is for instance activated, which is visible from the highlighted background of the applicable line. The rest of the input objects have the following meanings:

Probing: Feeling the face end of the blank to detect the null point.

Fluting: Creating flutes. This input object includes further details, which extend from Clearance Step 1 through Clearance Ef. In the field captioned "Operation", still other input objects can be selected. Various tools can be associated with each input object. These can be selected under the input field captioned "Wheel". In FIG. 6, the selection has already been made and is shown in each respective line.

Associated with the "Fluting" input object are input parameters which are primarily accessible in the input mask captioned "Clearance Step 2, Line". Input fields 18 present here are used to parametrize the input object. Dimensions, ratios, and other input parameters can be input into the fields shown. In FIG. 1, this means that an input parameter supply 19 is associated with each input object in the input object supply 15.

Figure 7A:
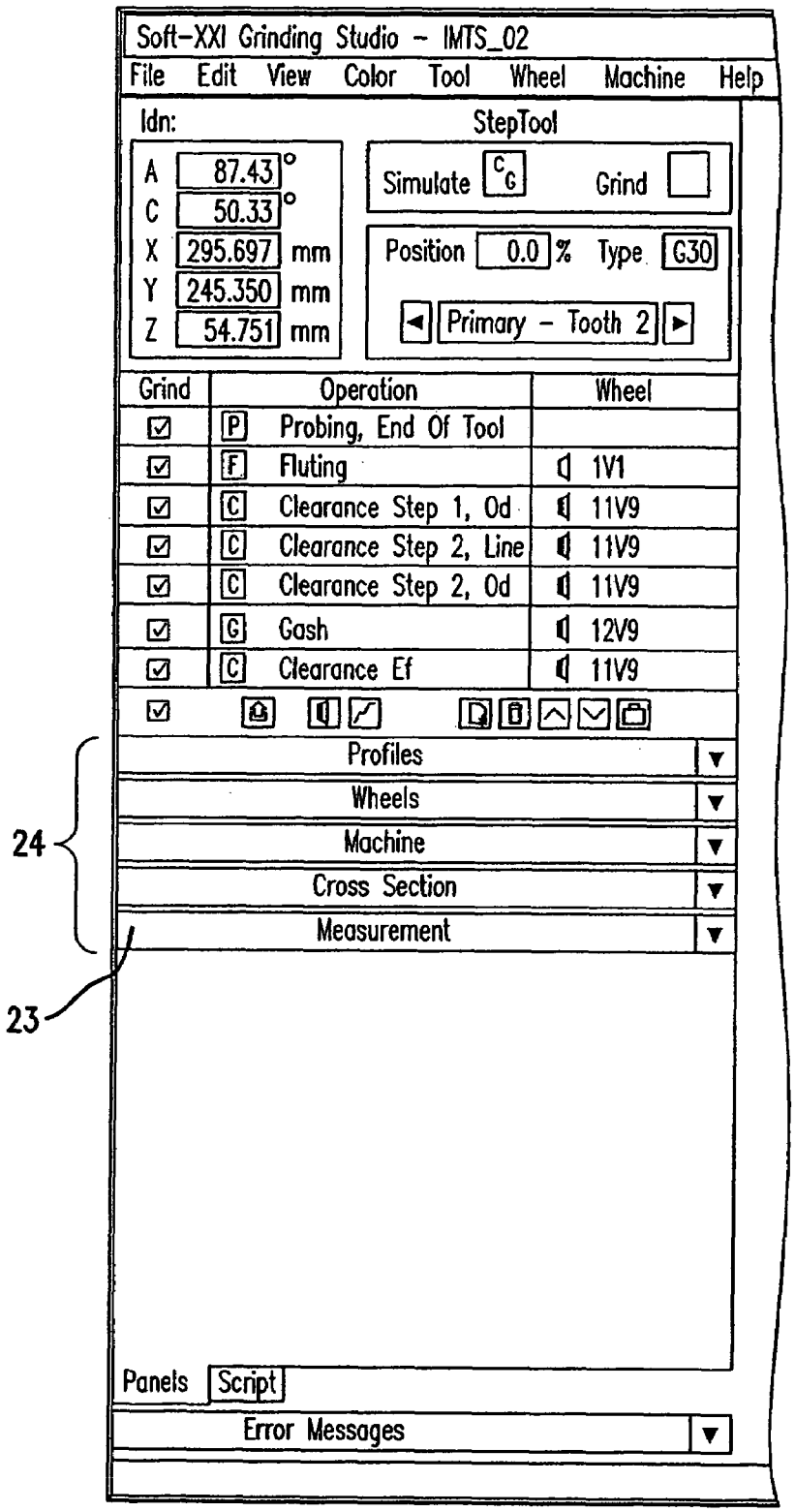
Figure 7B:
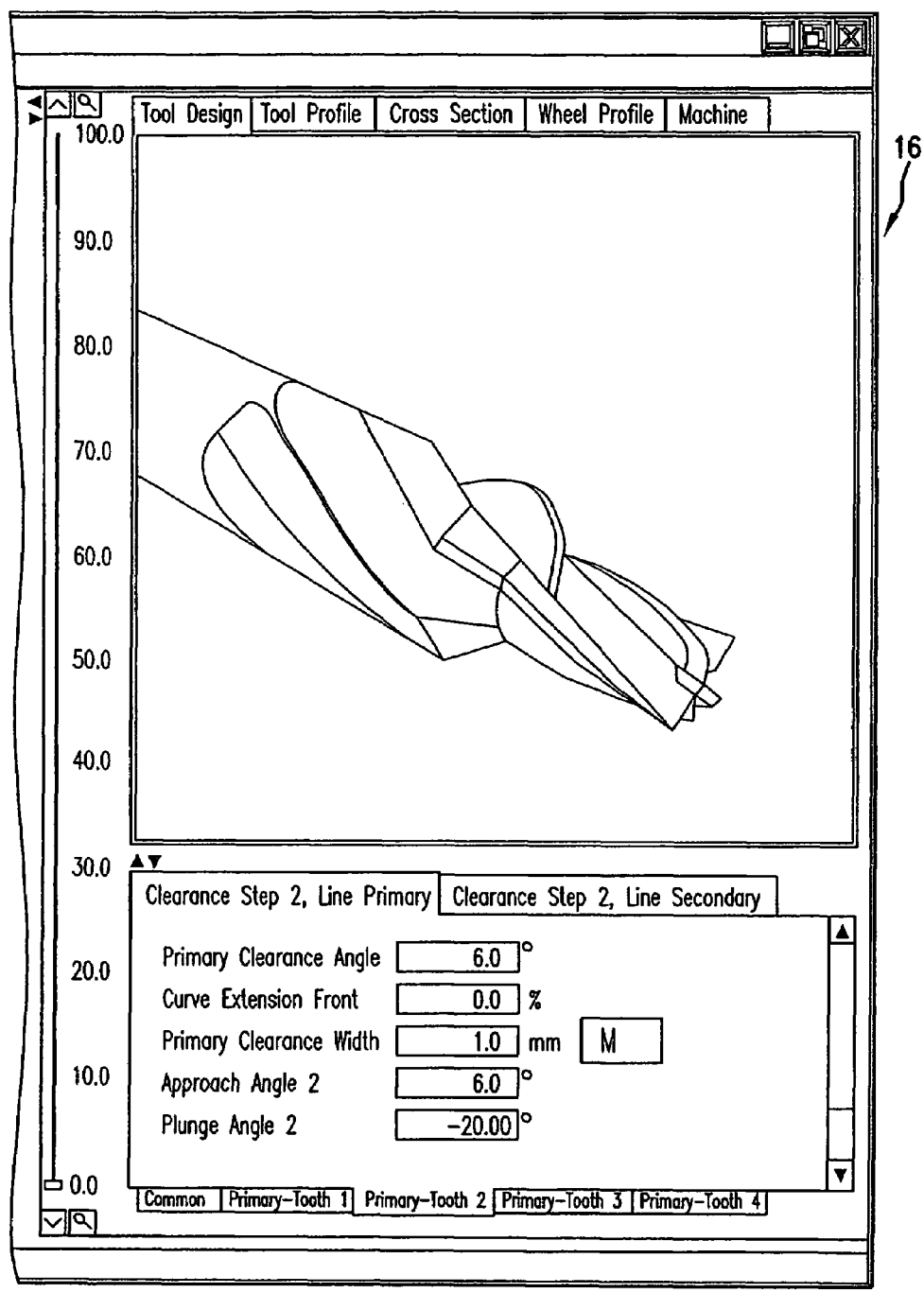

The input module 14 contemplates still other input possibilities. This purpose is served by a supply 21 of measurement objects, which are associated with links 22, selected input objects, and input parameters for them. For the sake of illustration, see FIG. 7. A measurement object can be a measurement parameter, an inspection point, an angle, or the like. In FIG. 7, a measurement parameter has been selected as the measurement object, namely the "Primary Clearance Width". The selection of this input parameter of a special input object as a measurement object at the same time is done by opening a menu 23 captioned "Measurement", which keeps various measurement objects in readiness. The menu 23 is disposed in a menu selection field 24, in which various workpiece profiles, grinding wheels, grinding machines and workpiece cross sections are held in readiness as a supply, in each case in subsidiary menus. The definition of the "Primary Clearance Width" as a measurement parameter is illustrated in FIG. 7 by the colored background of the input field and/or designation of the input parameter by a capital M next to it.

Figure 8A:
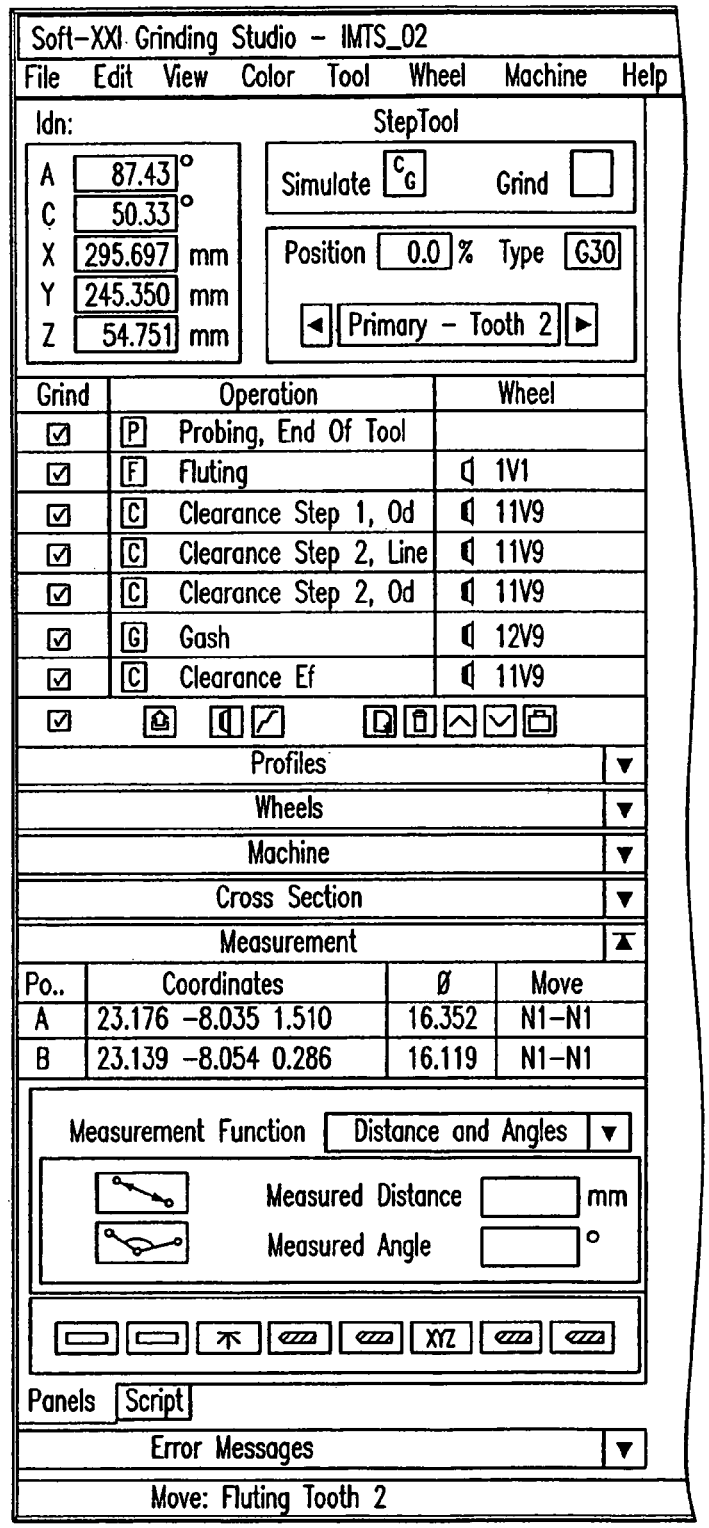
Figure 8B:
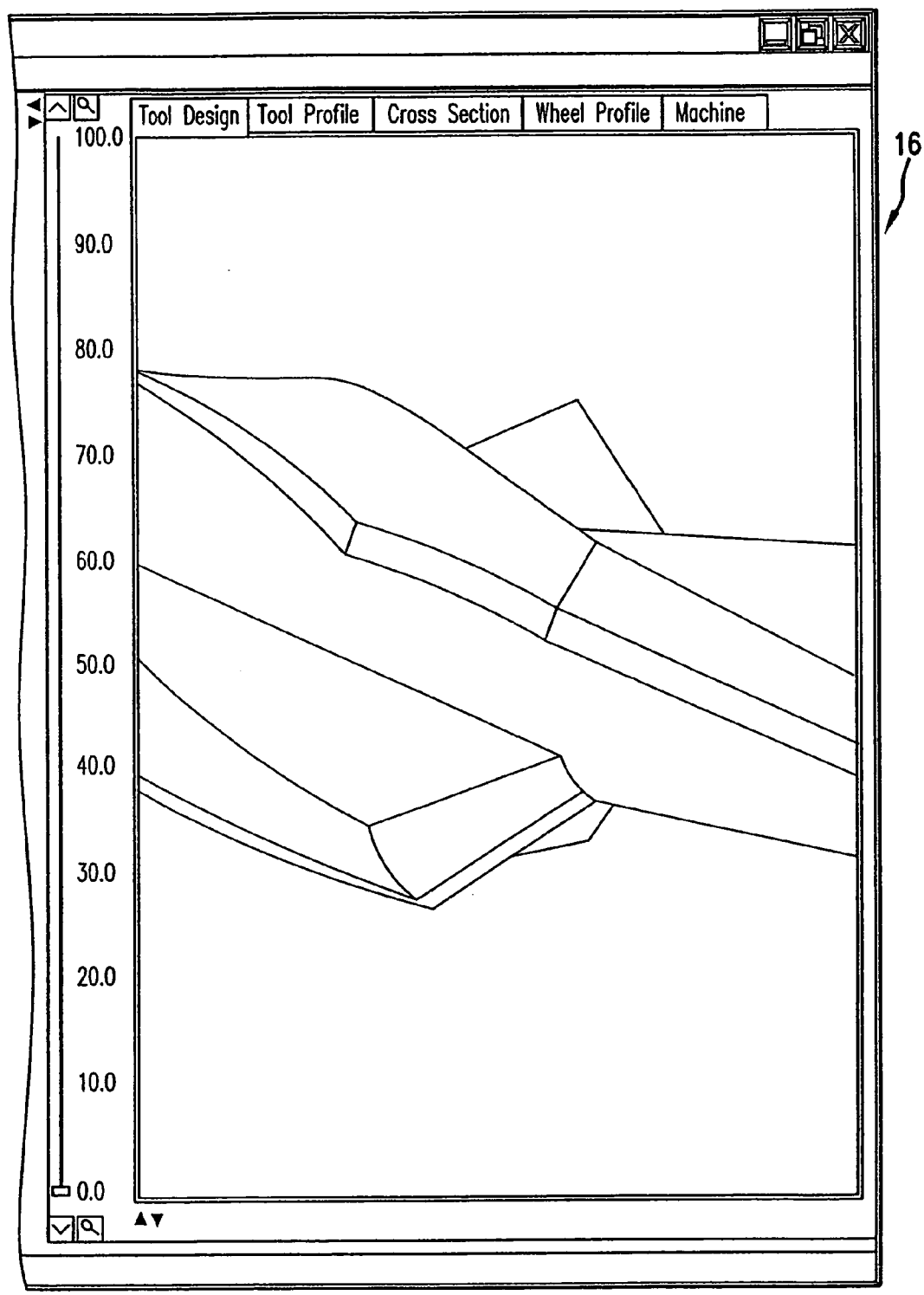

FIG. 8 shows the input of inspection points as measurement objects. To that end, the "Measurement" menu is opened. In a display field of the screen display 16, the workpiece, configured by inputting input objects and their input parameters, is visually shown. By clicking on a mouse, inspection points A, B can now be set here and are reflected in the "Measurement" menu on the basis of their coordinates and radii. Via the "Measurement Function" menu, the function of the inspection points is defined. In the present case, distance and angle have been selected. Once the inspection points have been placed on body edges, the program assumes that they are to be bound to the edges. They are therefore linked with input objects, which either by themselves or jointly define the applicable edge. For the inspection point A, these are the input object for the adjacent chucking space and for the adjacent flank.

The program generator 3 includes a machining program module 25. This module converts the data, acquired with the input module, into a machine control program. This is done by converting the parametrized input objects, each of which by itself already defines a relative motion between the workpiece and the grinding wheel, into NC data on the basis of the concrete geometry of the grinding machine selected. The program generator 6 also includes a modeling module. This module can be part of a display module 26 or can be connected to such a display module. The display module 26 cooperates with the display field of the screen display 16. The modeling module generates a geometric model 27, which displays a representation of the workpiece to be created. The geometric model includes all the work instructions for the grinding machine 1 as well as a mathematical representation of the outcome of the work, that is, for instance, the completely machined workpiece. As an alternative to the above explanation, the display module 26 may be connected not to the modeling module but to the geometric model. The geometric model 27 forms the basis for setting up the measurement program 7. This purpose is served by a measurement program module 28, which combines data from the geometric model with data about the measurement task. The latter type of data are received by the measurement program module from the input module 14 on the basis of the defined measurement objects 21 and the associated link 22. If for instance the flank between the inspection points A, B is present in defined form in the geometric model, and the measurement objects or in other words inspection points A, B and their evaluation are predetermined, for instance in the form of defining the radii and the angle enclosed, then the measurement program can predetermine the requisite position motions of the positioning device 13 and the evaluation of the data obtained as a result.

Figure 2:
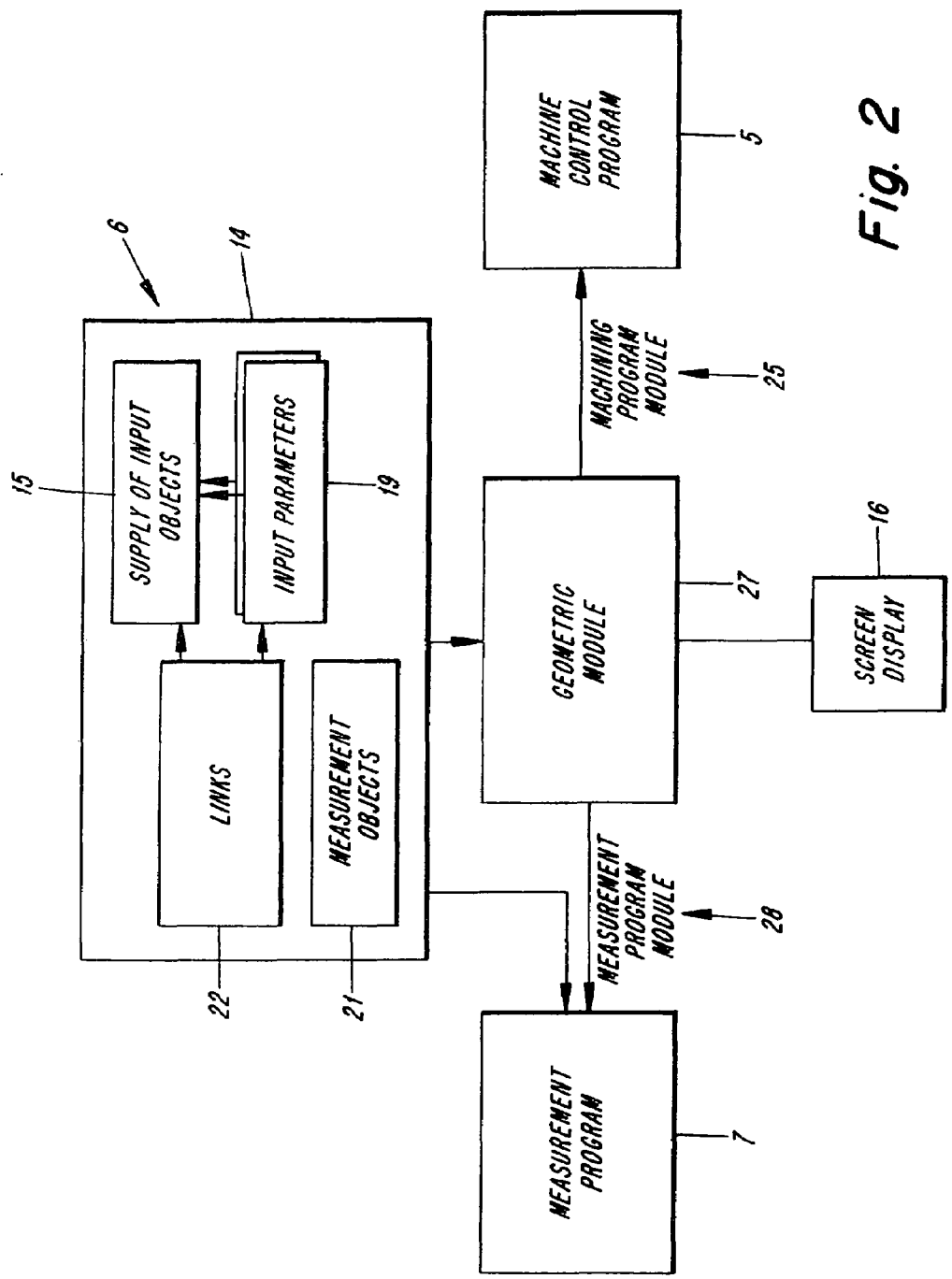
FIGS. 2 and 3 show modified embodiments of the software structure.

In FIG. 2, a modified embodiment of the program generator 6 is shown in simplified form. The program structure has been modified such that the machining program module 25 operates on the basis of data present in the geometric model 27. The screen display 16 is also based on the data of the geometric model. The measurement program module 28, however, as usual combines data from the input module 14 with data from the geometric model 27 to set up the measurement program 7 from them.

Figure 3:
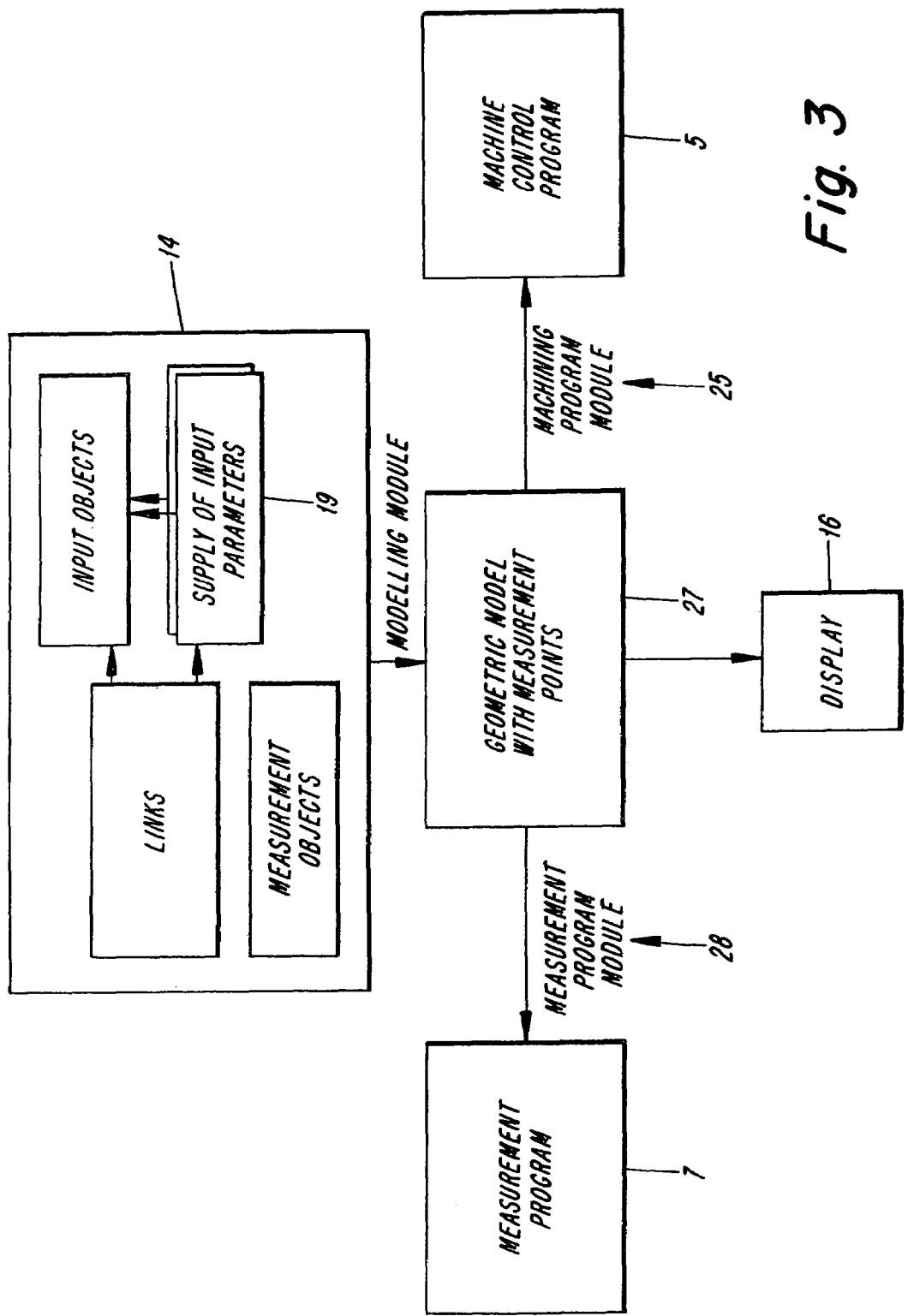

FIG. 3 illustrates one embodiment with a still more-centralized function of the geometric model 27. Here, the geometric model contains not only data about a three-dimensional presentation of the workpiece to be created but also data about the machining operations to be performed and also data about the measuring operations to be executed. These data have been taken from the input module 14. Both the machining program module 25 and the measurement program module 28 operate on the basis of the geometric model 27. Any change in the input parameters of the measurement objects or the links of the measurement objects with input objects or parameters thereof thus has an effect on the geometric model and beyond it on both the machine control program 5 and the measurement program 7. The screen display 16 is furthermore adapted synchronously. For the screen display 16 in FIGS. 6–8, this means for instance that after inspection points A, B have been placed using the screen display 16, they are input into the geometric model. If the user now, for instance in the menu shown in FIG. 6, changes one input parameter value, such as "Primary Clearance Width" from 1 mm to 2 mm, then the appropriate screen display immediately appears-at least if thus-modified machining is within the realm of the possible. The area shown highlighted in FIG. 8 then becomes correspondingly wider. The inspection points A, B are now once again located on the applicable edges and are farther away from one another. In the menu shown in FIG. 8, displayed values change, for instance in the "Measured Distance" field.

In this respect it should be noted in particular that the parametrized input objects show or describe machining operations. Since machining operations can be superimposed on one another, the parameters of the input objects only indirectly define the geometry of the workpiece. This becomes clear if the flank bounded by the inspection points A, B is looked at. The input object that characterizes this flank defines the three-dimensional distance along which the grinding wheel is guided. The boundary in terms of the cutting edge of this flank, however, is defined by the input object captioned "Chucking Space", because its parameters state how much material is removed at the cutting edge, or in other words where it is located precisely. The flank width, which is defined by the distance of the inspection points A, B from one another, is thus not purely an input value; instead, it results in the course of the machining. The interplay of the machining program module 25 and the measurement program module 28 on the basis of a common geometric model 27 makes it possible not only to visualize these effects and interdependencies of individual machining operations on the screen, but also to generate the associated measurement program.

Figure 5:
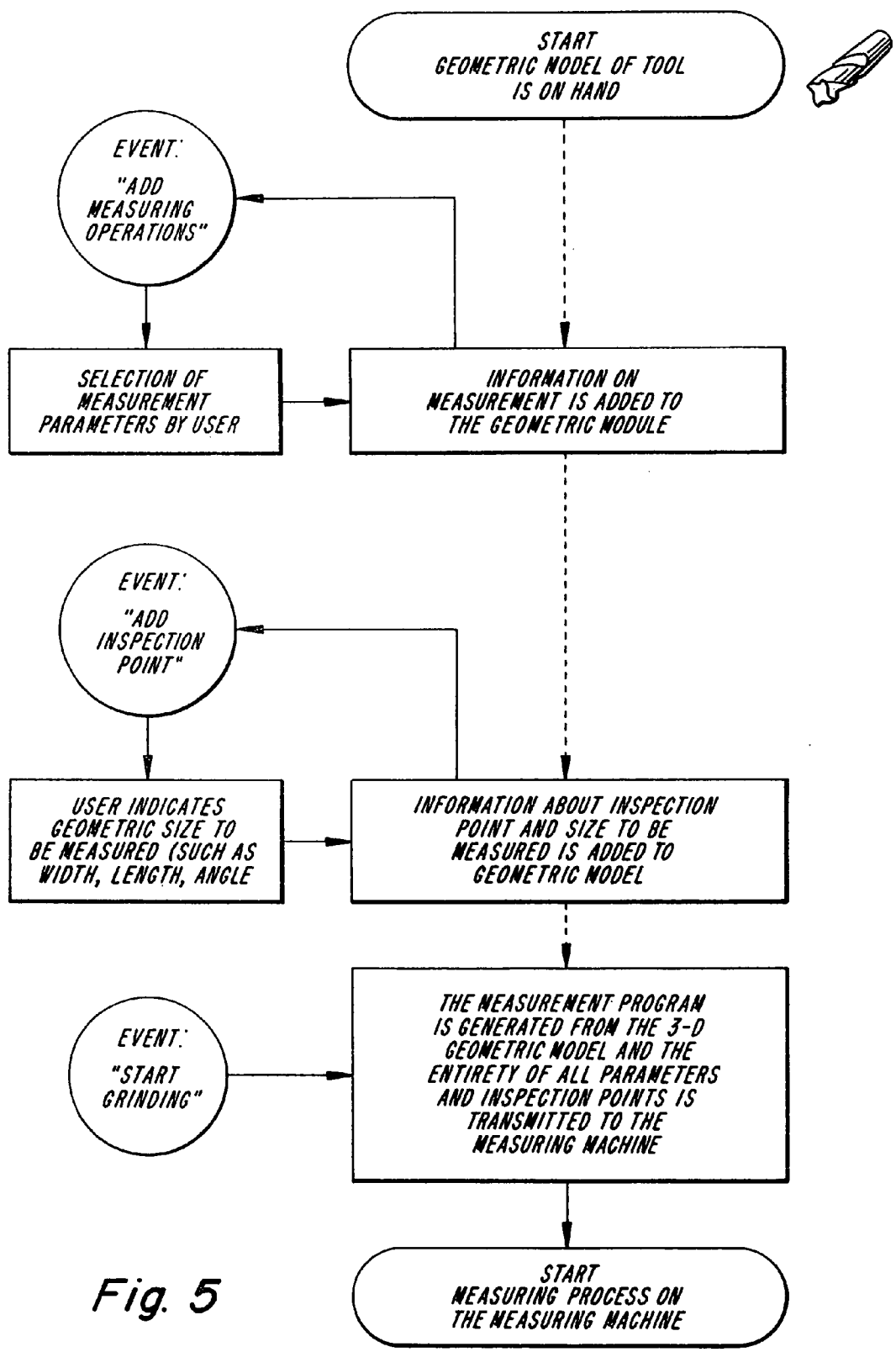
FIG. 5 depicts the data flow of the input of measuring operations.

FIGS. 5 and 6 illustrate the generation of the machine control program 5 and the measurement program 7 once again, from a different standpoint.

Figure 4:
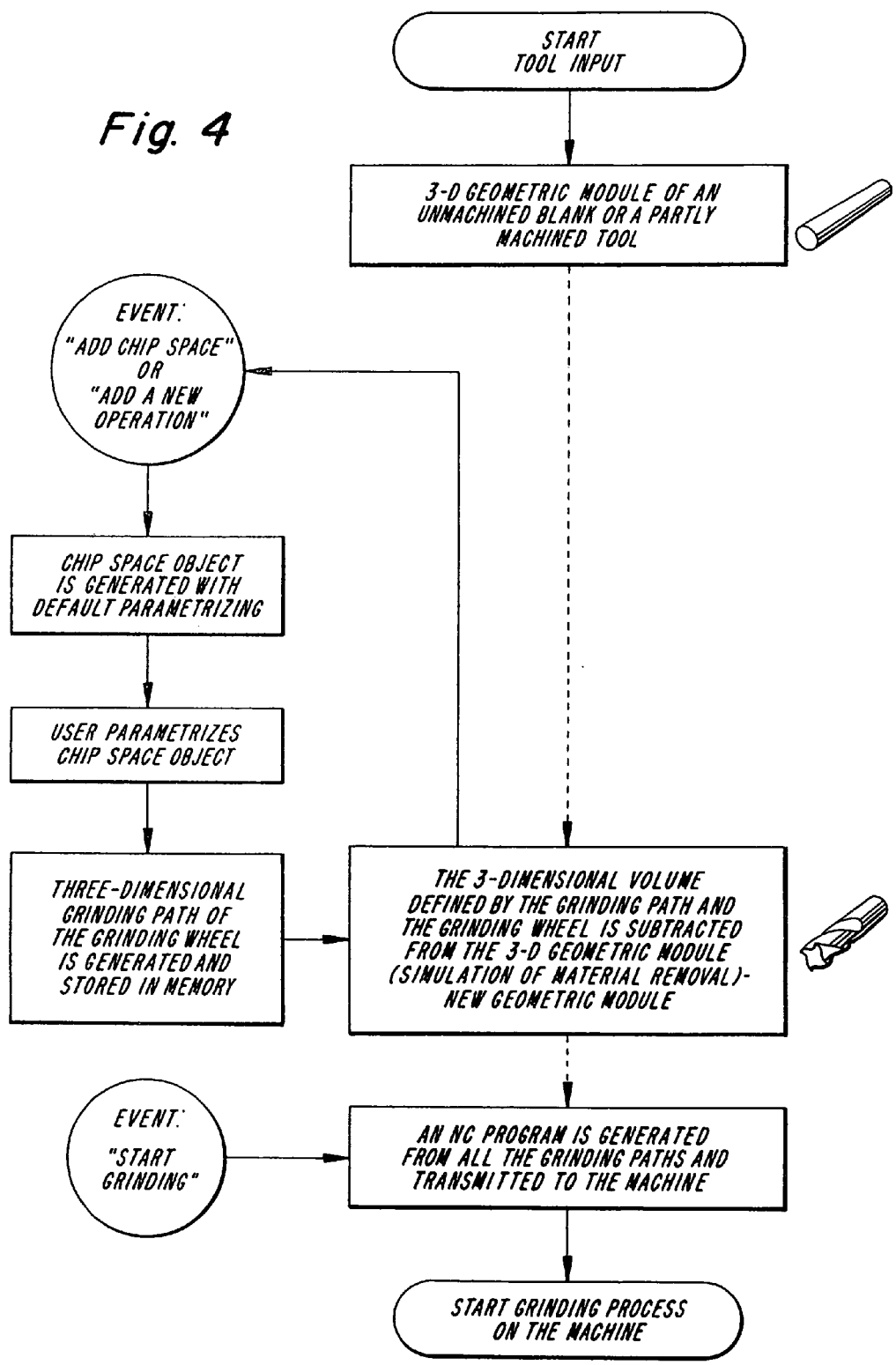
FIG. 4 depicts the data flow in designing a workpiece.

By suitable menu input, the type of tool to be created is first selected. This is done for instance in the "Profiles" menu in FIGS. 6–8. This also includes defining the number of teeth, according to which card file cards with input fields 18 (in the example of FIGS. 6–8, four file cards for four teeth) are accordingly created. This applies to the event, shown at the top left in FIG. 4 in a round field, according to which the chip space (flute), for instance, or a new operation is input. Next, parametrizing of the applicable input object is performed, initially with standard values, which as becomes visible in the next field can be modified by the user.

In the next step, the measurement program module (FIGS. 1, 2 or 3) generates the track that a grinding wheel leaves behind in a space in its motion pertaining to the selected, parametrized input object. The track of the grinding wheel is stored in memory and in the next central step is subtracted from the blank or from an already partly machined tool. The result is the geometric model of a workpiece on which the most recently input operation has been performed. This process is repeated as many times as needed until all the input operations have been performed virtually on the workpiece, or in other words until the geometric model for a workpiece with all the material subtractions to be performed according to the input objects has been created. Once this model is available and has been checked and verified, the NC program is generated from it and transmitted to the grinding machine and executed in the grinding machine.

FIG. 5 shows a diagram, also event-oriented, of the data flow in setting up a measurement program. The point of departure is the finished geometric model for the tool. It is also assumed that the user, in setting up the tool on the screen has not yet placed any measurement or inspection points. If he wants to do this now, then the event captioned "Add Measurement Parameters" appears when the user selects a measurement parameter. This information about the measurement parameter is added to the geometric model. This process can be repeated virtually arbitrarily often, to add various measurement parameters to the geometric model.

Another possibility of predetermining measurements is to specify inspection points and their significance. This is illustrated in the left center of FIG. 5. The inputting is once again done by means of the masks in FIG. 8.

The information obtained is added to the geometric model. Once the geometric model has been finally supplemented with all the measurement parameters and inspection points, the measurement program is generated from the three-dimensional geometric model completed to this point and is transmitted to the measuring machine.

What is claimed is:

1. An apparatus for integrated tool manufacture, comprising:
    an input module means for making a supply of input objects accessible that serve to produce a description of a workpiece, there being one or more input parameters belonging to each input object, each said input object defining a characteristic part of a cutting tool, the input module means permitting the selection of input objects and inputting their input parameters and making a supply of measurement objects accessible, from among which measurement objects are selected and linked with input objects or input parameters,
    display module means for visually displaying an image of a tool resulting from the chosen selection of input objects and the inputs,
    machining program module means for generating from the chosen selection of input objects and the parameters to be input therefor, a machine control program serving to control a machine tool, and
    measurement program module means which from the chosen selection of measurement objects and their linkage with input objects, serves a measurement program for controlling a measuring device.

2. The apparatus of claim 1 wherein each input object is linked with a machining operation, and the entirety of machining operations defines a machining task to be performed by the machine control program.

3. The apparatus of claim 1 wherein the display module means determines, from the selected input objects and the associated inputs, a geometric model, which defines the surface of a tool.

4. The apparatus of claim 1, wherein each measurement object is linked with a measuring operation, and the entirety of measurement objects and the associated links defines the measurement task to be performed by the measuring device.

5. The apparatus of claim 1 wherein the machine tool comprises a grinding machine.

6. The apparatus of claim 1 wherein the measuring device is integrated with the machine tool.

7. The apparatus of claim 1 wherein the measuring device comprises a measuring machine.

8. A method for controlling a machine tool and an associated measuring device, comprising the steps of:
    A) actuating an input module for furnishing a supply of input objects which set up a description of a workpiece for selection, and one or more input parameters that are interrogated belong to each input object, and furnishing a supply of measurement objects for selection, and links of selected measurement objects with input objects are brought about;
    B) actuating a display module for displaying an image of a tool resulting from the chosen selection of input objects and the inputs;
    C) actuating a machining program module for generating, on the basis of the chosen selection of input objects and the parameters input therefor, a machine control program which serves to control a machine tool; and
    D) actuating a measurement program module for generating, from the chosen selection of measurement objects and their linkage with input objects, a measurement program for controlling a measuring device, wherein there is determined, from the selected input objects, which are each linked with a machining operation, and from the associated inputs, a geometrical model that defines the surface of a tool, wherein the geometric model is displayed.

9. The method of claim 8 wherein measurement object is associated with a measuring operation, and measurement parameters are defined on the basis of the selected input objects and associated input parameters.

10. The method of claim 8, wherein a measurement object is associated with a measuring operation, and measurement parameters are defined on the basis of the geometric model.

11. A method for controlling a machine tool and an associated measuring device, comprising the steps of:
    A) actuating an input module for furnishing a supply of input objects which set up a description of a workpiece for selection, and one or more input parameters that are interrogated belong to each input object, and furnishing a supply of measurement objects for selection, and links of selected measurement objects with input objects are brought about;
    B) actuating a display module for displaying an image of a tool resulting from the chosen selection of input objects and the inputs;
    C) actuating a machining program module for generating, on the basis of the chosen selection of input objects and the parameters input therefor, a machine control program which serves to control a machine tool; and
    D) actuating a measurement program module for generating, from the chosen selection of measurement objects and their linkage with input objects, a measurement program for controlling a measuring device, wherein measurement parameters are defined on the basis of the selected input objects and associated input parameters and wherein inspection points are among the measurement parameters.

12. The method of claim 11 wherein monitoring is performed to determine whether inspection points are located on faces or edges of the geometric model.

13. The method of claim 12 wherein there is performed a request for correction is output, or an automatic correction.

14. An apparatus for integrated tool manufacture, comprising:
- an input module means for making a supply of input objects accessible that serve to produce a description of a workpiece, there being one or more input parameters belonging to each input object, the input module means permitting the selection of input objects and inputting their input parameters and making a supply of measurement objects accessible, from among which measurement objects are selected and linked with input objects or input parameters,
- display module means for visually displaying a geometric model that defines the surface of a tool resulting from the chosen selection of input objects and the inputs,
- machining program module means for generating from the chosen selection of input objects and the parameters to be input therefor, a machine control program serving to control a machine tool, and
- measurement program module means which from the chosen selection of measurement objects and their linkage with input objects, serves a measurement program for controlling a measuring device.

15. An apparatus for integrated tool manufacture, comprising:
- an input module means for making a supply of input objects accessible that serve to produce a description of a workpiece, there being one or more input parameters belonging to each input object, the input module means permitting the selection of input objects and inputting their input parameters and making a supply of measurement objects accessible, from among which measurement objects are selected and linked with input objects or input parameters,
- display module means for visually displaying a geometric model that defines the surface of a tool resulting from the chosen selection of input objects and the inputs,
- machining program module means for generating from the chosen selection of input objects and the parameters to be input therefor, a machine control program serving to control a machine tool, and
- measurement program module means which from the chosen selection of measurement objects and their linkage with input objects, serves a measurement program for controlling a measuring device wherein measurement parameters are defined on the basis of the selected input objects and associated input parameters and wherein inspection points are among the measurement parameters.

* * * * *